United States Patent
Bakker

(10) Patent No.: US 6,231,436 B1
(45) Date of Patent: May 15, 2001

(54) METHOD AND APPARATUS FOR UNIFORMLY POSITIONING LEGS OF SLAUGHTERED POULTRY

(75) Inventor: Simon Bakker, Oostzaan (NL)

(73) Assignee: Meyn Food Processing Technology B.V., Oostzaan (NL)

(*) Notice: Subject to any disclaimer, the term of this patent is extended or adjusted under 35 U.S.C. 154(b) by 0 days.

(21) Appl. No.: 09/429,120

(22) Filed: Oct. 27, 1999

(30) Foreign Application Priority Data

Nov. 16, 1998 (NL) .................................... 1010558

(51) Int. Cl.[7] .................................... A22C 21/00
(52) U.S. Cl. .................... 452/188; 452/163; 452/179
(58) Field of Search .............................. 452/188, 187, 452/163, 166, 167, 179

(56) References Cited

U.S. PATENT DOCUMENTS

| | | |
|---|---|---|
| 3,038,197 | 6/1962 | Turner . |
| 3,696,464 | 10/1972 | Dillon et al. . |
| 5,019,013 * | 5/1991 | Hazenbroek .................... 452/167 |
| 5,035,673 * | 7/1991 | Hazenbroek .................... 452/169 |
| 5,176,563 * | 1/1993 | Van Den Nieuwelaar et al. 452/167 |
| 5,188,539 * | 2/1993 | Hazenbroek .................... 452/167 |
| 5,766,064 * | 6/1998 | Gasbarro ........................ 452/167 |
| 6,004,199 * | 12/1999 | Habenicht et al. ............... 452/166 |

FOREIGN PATENT DOCUMENTS 0319114   6/1989   (EP) .

OTHER PUBLICATIONS

Search Report, The Netherlands patent office, Nov. 16, 1998.

\* cited by examiner

*Primary Examiner*—Willis Little
(74) *Attorney, Agent, or Firm*—Dority & Manning

(57) ABSTRACT

The invention relates to a method and apparatus for uniformly positioning legs of slaughtered poultry. Initially the legs are rotated in such a way that their knees end up pointing sideways in relation to a vertical plane passing through the overhead conveyor, subsequent to which the legs are rotated in such a way that the knees preferably end up pointing in the direction of transport. The apparatus for carrying out the method is provided with first and second direction checks.

13 Claims, 1 Drawing Sheet

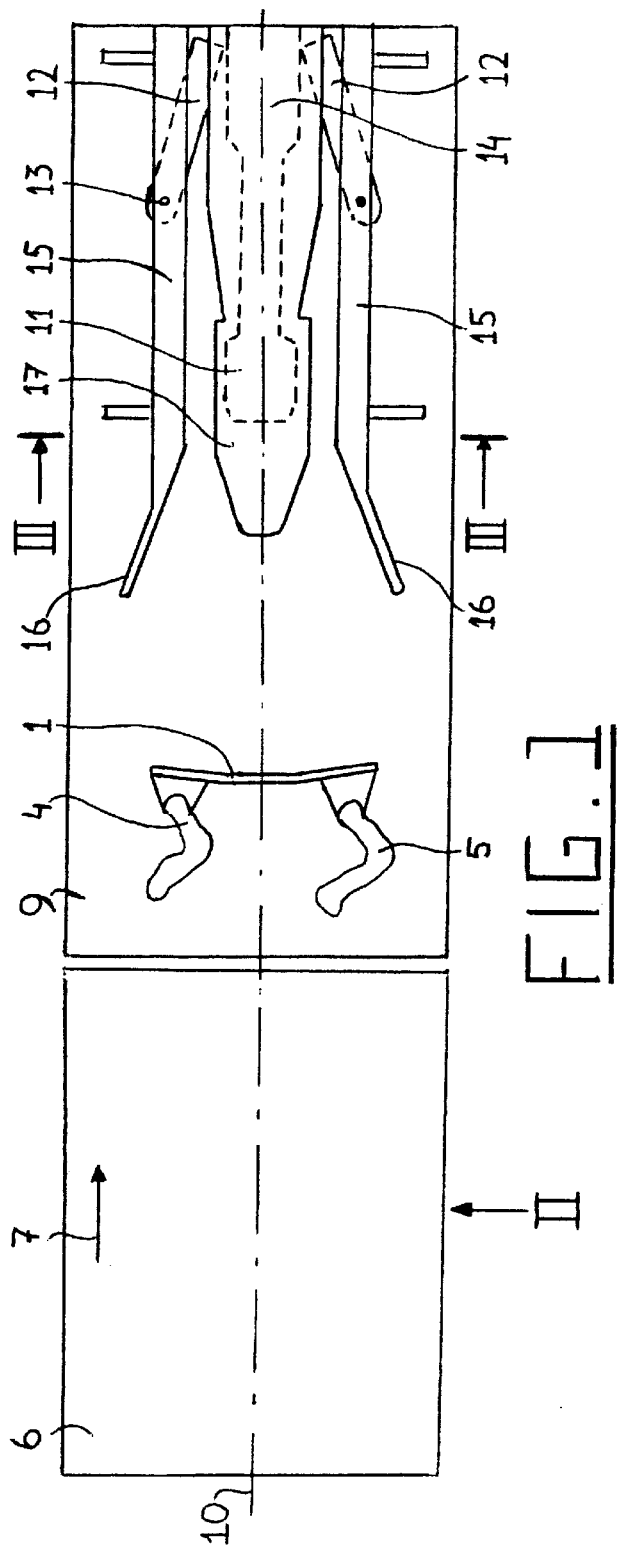
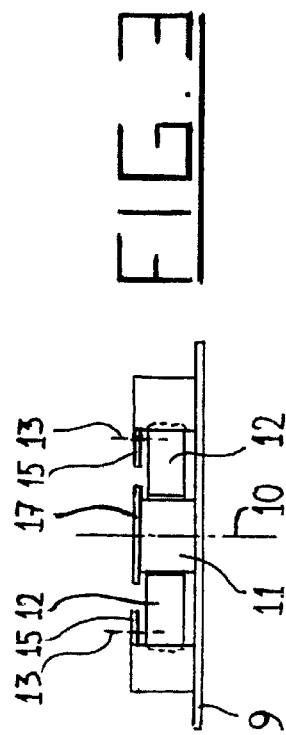
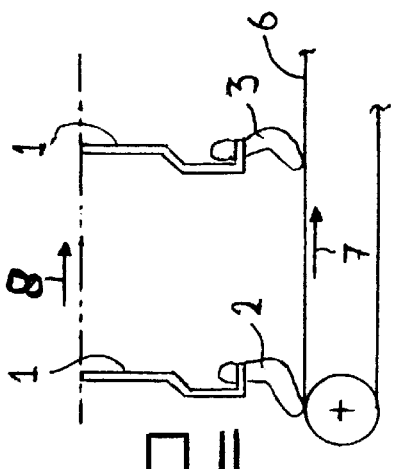

METHOD AND APPARATUS FOR UNIFORMLY POSITIONING LEGS OF SLAUGHTERED POULTRY

BACKGROUND

The invention relates to a method of uniformly positioning disjointed legs of slaughtered poultry, suspended by the ankles from the hooks of an overhead conveyor.

The Dutch patent application 1,002,881 in the name of the present assignee describes among other things a method of boning a leg of slaughtered poultry. In accordance with this known method, the leg is stretched out and the meat is stripped from the proximal end to the distal end of the leg. In order to be able to perform this known method, it is essential that the legs are delivered uniformly positioned. Only if the legs are uniformly positioning, is it possible to perform the method using an apparatus of the kind which is also described in said patent application.

Until now the uniform positioning of the legs has usually been carried out manually. However this requires many work hands, involving high costs while at the same time, this manual positioning is unpleasant and tedious work.

SUMMARY OF THE INVENTION

An object of the present invention is to provide a method whereby legs of slaughtered poultry can be uniformly positioned in a simple manner. Additional objects and advantages of the invention will be set forth in part in the following description, or may be obvious from the description, or may be learned through practice of the invention.

To this end the method according to the invention is characterized by at least the following steps:

a. rotating the legs in relation to the hooks of the overhead conveyor in such a way that their knees point sideways in relation to a vertical plane passing through the overhead conveyor;

b. subsequently rotating the legs in relation to the hooks such that all the knees either point in the direction of transport or in the opposite direction thereto.

Initially, the delivered disjointed legs of slaughtered poultry suspended from the hooks of an overhead conveyor are randomly positioned for rotation. During the first step of the method according to the invention this random rotation position is changed to a position in which the knees are pointed sideways in relation to said vertical plane (generally this is a vertical plane through the suspension point of the ankle). Basically two different positions are possible, namely pointing in the two opposite directions perpendicular to said vertical plane. Departing from these two defined positions, the second step of the method subsequently comprises a rotation of the legs in order to direct the knees in the direction of transport or in the opposite direction, respectively. It will be preferred to choose a second step in which all knees end up pointing in the direction of transport. In this final position the legs can be conveyed to an apparatus known as such, for stripping off the meat. All legs will be fed uniformly into such an apparatus and will assume a uniform position therein.

Legs that are delivered in the hooks of an overhead conveyor, are often lodged firmly in said hooks. Frequently it is not easily possible to rotate the legs in relation to said hooks. Therefore, in a preferred embodiment of the method, the above-mentioned step (a.) of the method according to the invention is preceded by a step in which the legs are slightly lifted off the hooks of the overhead conveyor. Such lifting will cause the legs to hang on the hooks more loosely, thereby facilitating rotation.

The invention also relates to an apparatus for uniformly positioning disjointed legs of slaughtered poultry suspended from the hooks of an overhead conveyor. Said apparatus is characterized in that a. first means are provided for rotating the legs in relation to the hooks of the overhead conveyor in such a way that their knees point sideways in relation to a vertical plane passing through the overhead conveyor;

b. second means are provided for subsequently rotating the legs in relation to the hooks such that all the knees either point in the direction of transport or in the opposite direction thereto.

With the aid of the first means, said rotation into one of the two positions pointing sideways is effected. The two subsequent means then ensure that the knees of the legs end up pointing in the direction of transport or in the opposite direction thereto.

In accordance with a preferred embodiment of the apparatus according to the invention, the first means constitute a substantially horizontal plate extending under the overhead conveyor, positioned at a distance below the hooks such that the legs transported by the overhead conveyor touch the plate and are dragged over it in such a manner that their knees are rotated into a sideways position. Legs transported by the overhead conveyor touch said plate and are dragged over said plate in a strongly sloping position. The legs consist of a lower leg and a thigh forming an angle at the knee joint. Due to the leg dragging over the plate and the leg's angled configuration, the influence of its own weight, causes the leg to be rotated in the hook of the overhead conveyor in such a manner that its knee is pointed sideways, i.e. substantially perpendicular to the overhead conveyor's direction of transport. Depending on the original position of the respective leg in the hook, this rotation may take place in one or the other direction, as a result of which the leg after passing said first means, may point into the one or the opposite sideways direction.

In respect of the second means, the possibility exists in a preferred embodiment, that they comprise a first direction check for rotating from the sideways pointing position to a position pointing into the direction of transport only those legs whose knees, after passing the first means, point sideways into a first direction, and a second direction check for the corresponding rotation of only those legs which, after passing the first means, point sideways into a second, opposite direction. The first direction check will only engage those legs which after passing the first means point sideways in a first direction. The second direction check, on the other hand, will only engage those legs which after passing the first means point sideways in the second, opposite direction.

In this connection, it is further preferred that the first and second direction checks are situated next to the course to be followed by the legs, and that at least one of said direction checks can be swivelled counter to a spring force away from said vertical plane. After passing the first means, the knees of the legs are pointed sideways, and as a result they project, as it were, outside of a vertical plane extending through the course followed by the legs. However, the thighs of the legs project even more in the opposite direction. For this reason the first and second direction check may be positioned next to said course to be followed, thereby allowing the legs to pass the direction checks, while said direction checks are nevertheless able to engage the legs.

The reason for opting for at least one of said direction checks being able to swivel counter to the spring force is in the first place to optimally take into account the form of the ankles by which the legs are suspended in the hooks of the overhead conveyor. After all, said ankles have joint knuckles which greatly impede a rotation in the one direction while hardly or not at all impeding a rotation in the other direction. It is therefore to advantage if the very direction checks that are supposed to effect the rotation of the leg in the direction impeded by the ankle, are able to engage the legs with some force. In this respect the spring force is of advantage. The rest of the direction checks may be stationary components because in principle, the gravitational force and the resulting reaction force of said direction checks exerted on the legs suffice to effect the desired rotation of the legs in the hooks. In the second place it is then possible to allow for the different leg sizes (thickness and degree of lateral projections with respect to said vertical plane), without losing the efficacy of said direction check.

Usually the hooks of the overhead conveyor are equipped such as to carry two legs next to each other at right angles to the direction of conveyance. In such a case the apparatus according to the invention is preferred wherein the first means comprise a two-sided, centrally positioned stationary direction check for engaging those legs whose knees point away from the vertical plane of symmetry of the hooks, while the second means comprise two sideways positioned direction checks that can be swivelled, for engaging those legs whose knees point toward the vertical plane of symmetry of the hooks. The hooks of the overhead conveyor always carry in the same place a left and a right leg. The mirror symmetry of left and right legs entails that the one kind of leg rotates easily in a counterclockwise direction and the other kind of leg rotates easily in a clockwise direction, while a rotation in the opposite direction is impeded by the above-mentioned knuckles of the ankle joint. This means that the positioning of the first and second direction checks for the left legs and right legs respectively will be the same but mirror symmetrical. This provides the possibility to use a two-sided, centrally positioned stationary direction check. The legs whose knees deviate from the said vertical plane of symmetry are rotated by this stationary direction check into a position in which the knees point forward, into the direction of conveyance. To this end the stationary direction check engages the thighs of the legs which are at the opposite end of the legs in relation to the ankles. The necessary rotation is hardly or not at all impeded by the ankles and is opposite for left and right legs. The more difficult rotation from a position in which the knees of the legs point toward the vertical plane of symmetry is effected by the two direction checks positioned at the sides that can be swivelled and are spring-activated. Here also the thighs are engaged.

In order to further optimize the working of the apparatus according to the invention there is the possibility of using guides extending near and in front of the first and second means and feed guides for the legs. Such guides may comprise, among other things, a horizontal guide plate extending above at least a portion of the direction checks, the rim of which being suitably profiled.

In correspondence with the earlier remarks regarding the method according to the invention, it is possible that preceding the first means, means are applied for slightly lifting the legs off the hooks. This is constructively possible if, preceding the first means, a horizontal conveyor belt is provided under the overhead conveyor whereby the distance from the hooks is such that the legs transported by the overhead conveyor will touch the conveyor belt whose speed of transport is greater than the speed of transport of the overhead conveyor. The lower end of the legs suspended from the hook will touch said conveyor belt, and since said conveyor belt moves at a greater speed than the overhead conveyor, the legs will be slightly lifted off the hooks such that after having passed said conveyor belt, they will hang in the hooks more loosely, which considerably facilitates a subsequent rotation by the first or second means respectively.

The invention will be further elucidated below with reference to the drawing which represents an embodiment of the apparatus according to the invention.

BRIEF DESCRIPTION OF THE DRAWINGS

FIG. 1 shows a schematic top view of the apparatus according to the invention;

FIG. 2 shows a partial side view corresponding to II in FIG. 1; and

FIG. 3 shows a cross section according to III—III in FIG. 1.

DETAILED DESCRIPTION

The apparatus represented in the Figures is designed for uniformly positioning disjointed legs 2–5 of slaughtered poultry, suspended by the ankles from the hooks 1 of an overhead conveyor (not shown). In the embodiment shown, the first part of the apparatus comprises a horizontal conveyor belt 6 positioned under the overhead conveyor, which moves at a greater speed 7 than the transport speed 8 of the overhead conveyor. The conveyor belt 6 is placed under the hooks 1 at a distance such that the legs 2–5 touch the conveyor belt 6. Due to the difference in speed between the conveyor belt 6 and the hooks 1, the legs are lifted slightly from their original position (FIG. 2, leg 2) in the hooks 1 (to the position of leg 3 in FIG. 2), such that they are no longer jammed therein. This facilitates the rotation of the legs in the hooks as described later.

Also extending under the overhead conveyor and succeeding the conveyor belt 6 is a substantially horizontal plate 9. This horizontal plate 9 is again placed under the hooks 1 at a distance such that the legs 2–5 transported by the overhead conveyor touch said plate 9. As the legs are dragged by the hooks over said plate 9, the gravitational force and the frictional force between the legs and the plate 9 will rotate the legs into a position in which they will point sideways in relation to the (arbitrary) vertical plane through the overhead conveyor. This may, for example, be a vertical plane through the suspension points of the ankles. Basically it means that the knees are pointed perpendicularly to the transport direction of the overhead conveyor. As indicated in FIG. 1 by means of a vertical plane of symmetry 10, each leg can assume two positions. The knee of a leg 4 points toward this plane of symmetry 10, while the knee of a leg 5 points away from this plane of symmetry. The legs 4 and 5 are suspended from a traditional double hook 1, equipped to carry two legs next to each other at right angles to the transport direction of the overhead conveyor. Each double hook 1 carries on the same side always a left or right leg respectively. Of course, each of the legs 4 and 5 may also have the opposite orientation. This means that the knee of leg 4 may also point away from the plane of symmetry 10 and that the knee of leg 5 may point toward said plane of symmetry 10.

The position of the legs illustrated by means of the legs 4 and 5 in FIG. 1 is, as already mentioned, caused by the horizontal plate 9. In this position the legs will arrive at a first direction check 11 which will only engage those legs whose knees point away from the plane of symmetry 10. After all, the thigh of these legs projects more in the opposite direction, so that said thigh will be able to engage the respective first direction check 11. In FIG. 1 this means that leg 4 will not engage the first direction check 11, whereas leg 5 will. As a result of the interaction between the leg 5 and the direction check 11, leg 5 will rotate into a position where the knee points substantially in the direction of transport (and at the same time slightly downward). After having passed the direction check 11, the leg 5 will again hang free on the hook 1 and point its knee into the direction of transport.

The first direction check 11 is double-sided, that is to say that both its surfaces pointing away from the plane of symmetry 10 function as direction check, and are thus able to engage passing legs. When an overhead conveyor is involved comprising hooks from which only one leg is suspended, the direction check 11 needs to be only one-sided.

Succeeding the direction check 11 are two second direction checks 12. Said second direction checks 12 can swivel about vertical axes 13, and their free end is spring-activated in the direction of the plane of symmetry 10 by means of a spring means which is not further illustrated. With their free end they are able to engage an extension 14 of the first direction check 11.

Each leg will pass between the free end of a second direction check 12 and the extension 14 of the first direction check 11. To this end, said second direction check 12 will swivel about the vertical axis 13 counter to the spring force. If the knee of the respective leg has already been positioned into the direction of transport by the first direction check 11, the second direction check 12 will fulfil no further function. If, however, a leg passes whose knee was initially pointed toward the plane of symmetry 10 (such as leg 4) and has therefore passed the first direction check 11 without hindrance, said leg will be rotated under the influence of the second direction check 12 into a position in which the knee will point again into the overhead conveyor's direction of transport.

It should be noted, that a rotation of the legs in the hooks 1 caused by the first direction check 11 is relatively simple. For each left or right leg respectively this rotation occurs in an anatomically corresponding (opposite) direction. Anatomically, the shape of the ankle joint engaging the hook 1 readily permits such a rotation. In contrast, a reverse rotation of a leg in the hook 1 will be impeded by joint knuckles on the ankle. However, the fact that the second direction checks 12, which effect such a reverse rotation, are spring activated allows a greater force to be exerted on the passing legs, so that the desired rotation can still be effected.

The apparatus further includes guides 15 and angled feed guides 16 for optimally guiding the leg to effect an interaction with the various direction checks 11, 12. In addition, a central guide plate 17 is applied on top of the first direction check 11 provided with a suitably profiled rim.

The invention is not limited to the above-described embodiment which, within the scope of the appended claims, may be varied in a numerous of ways.

What is claimed is:

1. A method of uniformly positioning disjointed legs of slaughtered poultry suspended by the ankles from the hooks of an overhead conveyor, comprising the steps of:
   slightly lifting the legs off the hooks of the overhead conveyor;
   rotating the legs in relation to the hooks of the overhead conveyor in such a way that their knees point sideways in relation to a vertical plane passing through the overhead conveyor; and
   subsequently rotating the legs in relation to the hooks such that all the knees either point in the direction of transport or in the opposite direction thereto.

2. An apparatus for uniformly positioning disjointed legs of slaughtered poultry suspended from hooks of an overhead conveyor, comprising:
   first means for rotating the legs in relation to the hooks of the overhead conveyor in such a way that their knees point sideways in relation to a vertical plane of symmetry passing through the overhead conveyor;
   second means for subsequently rotating the legs in relation to the hooks such that all the knees point in the same direction with respect to the direction of transport of the legs; and
   wherein said second means comprises a first direction check device disposed after the first means in the direction of transport of the legs configured to rotate legs from a first sideways pointing position to the position with respect to the direction of transport, and a second direction check device disposed after the first means in the direction of transport of the legs configured to rotate legs from a second sideways pointing position to the position with respect to the direction of transport.

3. The apparatus as in claim 2, wherein said first and second direction check devices are disposed along the path of travel of the legs and at least one of the first and second check devices is spring biased and pivotal towards the legs.

4. A method of uniformly positioning disjointed legs of slaughtered poultry suspended by the ankles from the hooks of an overhead conveyor, comprising the steps of:
   rotating the legs in their respective hooks of the overhead conveyor in such a way that their knees point sideways in relation to a vertical plane of symmetry passing through the overhead conveyor; and
   subsequently rotating the legs in relation to the hooks such that all the knees either point in the direction of transport or in the opposite direction thereto.

5. The method as in claim 4, wherein all of the legs are rotated such that their knees point in the direction of transport.

6. The method as in claim 4, further comprising lifting the legs slightly in the hooks prior to the first step of rotating the legs so that the legs are more easily rotated in the hooks.

7. An apparatus for uniformly positioning disjointed legs of slaughtered poultry suspended from hooks of an overhead conveyor, comprising:
   a first device disposed relative to said overhead conveyor to contact the legs held within said hooks and rotate the legs in said hooks so that their knees point sideways in relation to a vertical plane of symmetry passing through said overhead conveyor; and
   a second device disposed relative to said overhead conveyor and after said first device in a direction of transport of the legs to contact the legs held within said hooks and rotate the legs in said hooks such that all the knees point in the same direction with respect to the direction of transport of the legs.

8. The apparatus as in claim 7, wherein said first device comprises a generally horizontally disposed plate member positioned below said hooks at a distance such that the legs suspended in said hooks are dragged over said plate member and caused to rotate sideways.

9. The apparatus as in claim 7, wherein said second device comprises first and second direction check members disposed after the first device in the direction of transport of the legs, said first direction check member configured to rotate the legs from a first sideways pointing position to the position with respect to the direction of transport and said second direction check member configured to rotate legs from a second sideways pointing position to the position with respect to the direction of transport.

10. The apparatus as in claim 9, wherein said hooks are configured to carry two legs disposed adjacent to each other in a plane generally perpendicular to the direction of transport of the legs, said first direction check member comprising a two-sided stationary member configured to engage those legs whose knees point away from the vertical plane of symmetry of said overhead conveyor, and said second direction check member comprises biased members that swivel into engagement against those legs whose knees point toward the vertical plane of symmetry.

11. The apparatus as in claim 10, further comprising guides disposed before said first and second direction check members.

12. The apparatus as in claim 7, further comprising a lifting device disposed before said first device to contact and slightly lift the legs within their respective hooks.

13. The apparatus as in claim 12, wherein said lifting device comprises a horizontal conveyor disposed below said overhead conveyor at a distance so as to contact the legs, said horizontal conveyor having a speed of transport greater than that of said overhead conveyor.

* * * * *